United States Patent
Freger et al.

(10) Patent No.: US 10,853,689 B2
(45) Date of Patent: Dec. 1, 2020

(54) METHODS FOR MORE EFFECTIVELY MODERATING ONE OR MORE IMAGES AND DEVICES THEREOF

(71) Applicant: WebFurther, LLC, Irvine, CA (US)

(72) Inventors: Jonathan Freger, Irvine, CA (US); Joshua Buxbaum, Los Angeles, CA (US)

(73) Assignee: WEBFURTHER, LLC, Irvine, CA (US)

( * ) Notice: Subject to any disclaimer, the term of this patent is extended or adjusted under 35 U.S.C. 154(b) by 0 days.

(21) Appl. No.: 15/727,979

(22) Filed: Oct. 9, 2017

(65) Prior Publication Data

US 2019/0108416 A1  Apr. 11, 2019

(51) Int. Cl.
*G06K 9/62* (2006.01)
*G06F 16/51* (2019.01)
*G06K 9/00* (2006.01)

(52) U.S. Cl.
CPC ........... *G06K 9/6215* (2013.01); *G06F 16/51* (2019.01); *G06K 9/00624* (2013.01); *G06K 9/62* (2013.01); *G06K 9/6268* (2013.01)

(58) Field of Classification Search
CPC ..... G06K 9/6215; G06K 9/6268; G06F 16/51
See application file for complete search history.

(56) References Cited

U.S. PATENT DOCUMENTS

| 2005/0100195 A1* | 5/2005 | Li | G06K 9/00248 382/118 |
|---|---|---|---|
| 2013/0121566 A1* | 5/2013 | Paris | G06K 9/00275 382/159 |
| 2014/0348440 A1* | 11/2014 | Bergner | G06T 11/006 382/254 |
| 2015/0317562 A1* | 11/2015 | Srinivasan | G06N 20/00 706/11 |

* cited by examiner

*Primary Examiner* — John W Lee
(74) *Attorney, Agent, or Firm* — Troutman Pepper Hamilton Sanders LLP (Rochester)

(57) ABSTRACT

Methods, non-transitory computer readable media, and image moderation management computing apparatuses that receive a request that includes an image to be moderated. A percentage match of the received image against one or more computer vision models for one or more different categories is identified. A determination is made when the percentage match is within a range between customizable lower and upper thresholds for one or more of the different categories. Image moderation analysis data on the received image from one of one or more moderator computing devices is obtained when the percentage match is within the range. One or more stored rules on the received image are executed based on the obtained image moderation analysis data.

6 Claims, 3 Drawing Sheets

METHODS FOR MORE EFFECTIVELY MODERATING ONE OR MORE IMAGES AND DEVICES THEREOF

FIELD

This invention relates to methods for more effectively moderating one or more images and devices thereof.

BACKGROUND

In a variety of different types of environments, such as at home, in a public setting, or at work by way of example, there is an ongoing need and desire to be able to review, sort and moderate images. Additionally, regardless of the type of environment, there also may be vastly different requirements for reviewing, sorting, and moderating images based on other characteristics, such as age and/or culture, by way of example. Unfortunately, current image moderations systems are not dynamic enough to quickly and effectively adjust to all of these different possible characteristics.

SUMMARY

A method for moderating one or more images implemented by an image moderation management system comprising one or more image moderation management computing apparatuses or one or more moderator computing devices, the method includes receiving, by an image moderation management computing apparatus, a request that includes an image to be moderated. A percentage match of the received image against one or more computer vision models for one or more different categories is identified. A determination is made, by the image moderation management computing apparatus, when the percentage match is within a range between customizable lower and upper thresholds for one or more of the different categories. Image moderation analysis data on the received image from one of one or more moderator computing devices is obtained, by the image moderation management computing apparatus, when the percentage match is within the range. One or more stored rules on the received image are executed, by the image moderation management computing apparatus, based on the obtained image moderation analysis data.

An image moderation management computing apparatus, comprising memory comprising programmed instructions stored thereon and one or more processors configured to be capable of executing the stored programmed instructions to receive a request that includes an image to be moderated. A percentage match of the received image against one or more computer vision models for one or more different categories is identified. A determination is made when the percentage match is within a range between customizable lower and upper thresholds for one or more of the different categories. Image moderation analysis data on the received image from one of one or more moderator computing devices is obtained when the percentage match is within the range. One or more stored rules on the received image are executed based on the obtained image moderation analysis data.

A non-transitory computer readable medium having stored thereon instructions for moderating one or more images comprising executable code which when executed by one or more processors, causes the one or more processors to receive a request that includes an image to be moderated. A percentage match of the received image against one or more computer vision models for one or more different categories is identified. A determination is made when the percentage match is within a range between customizable lower and upper thresholds for one or more of the different categories. Image moderation analysis data on the received image from one of one or more moderator computing devices is obtained when the percentage match is within the range. One or more stored rules on the received image are executed based on the obtained image moderation analysis data.

This technology provides a number of advantages including providing methods, non-transitory computer readable media, image moderation management systems, and image moderation management computing apparatuses that provides more effective moderation of images, such as avatars, profile pictures, contest entries, and photo album pictures by way of example. Additionally, with this technology customizable feedback from a moderator can be quickly and easily incorporated in. Further with this technology, moderation of images can easily be customized based not only on the particular setting or environment, but also based on one or more characteristics, such as age and/or culture, by way of example.

DETAILED DESCRIPTION

Figure 1:
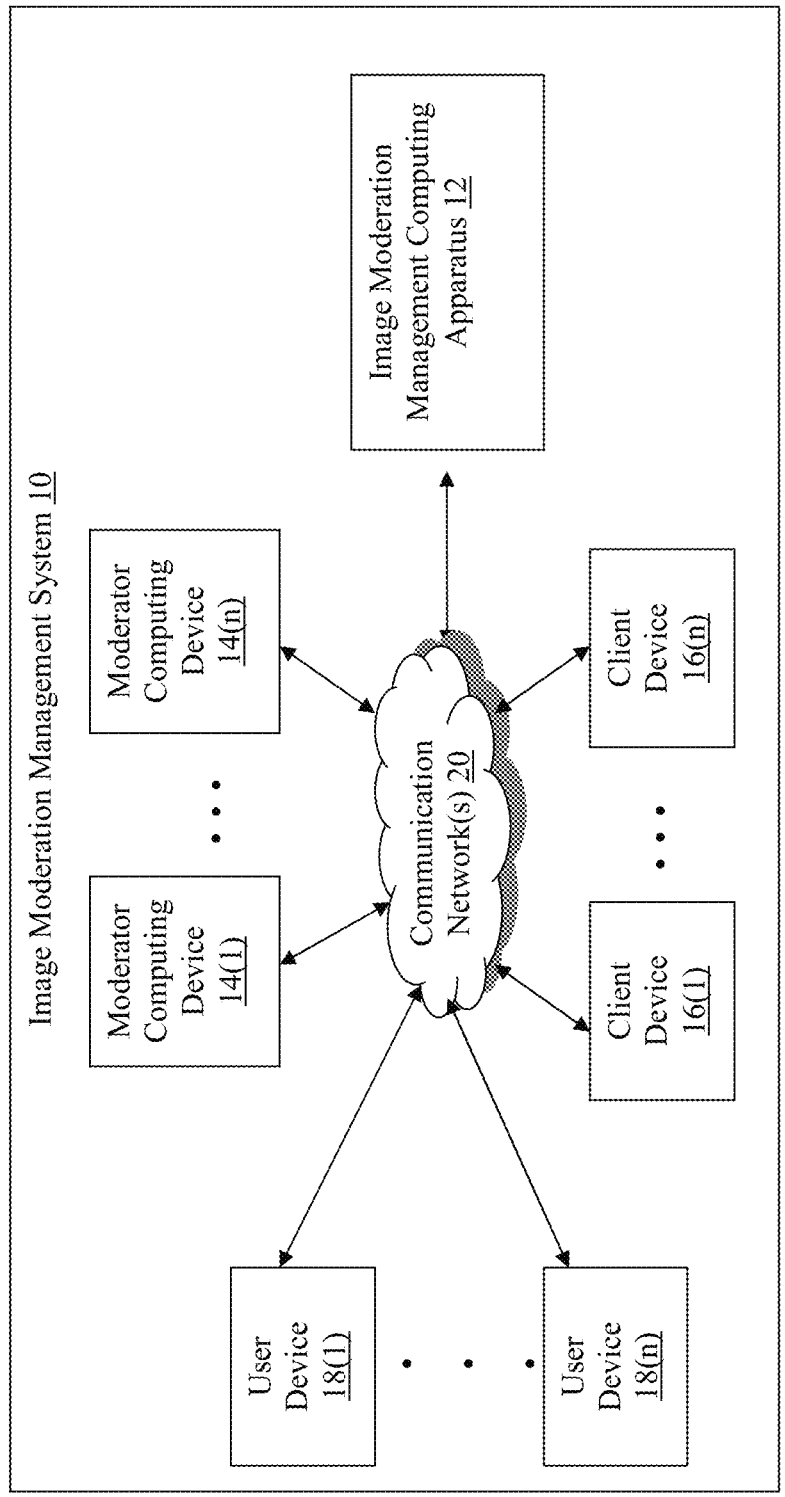
FIG. 1 is a diagram of an example of an environment with an example of an image moderation management computing apparatus.
Figure 2:
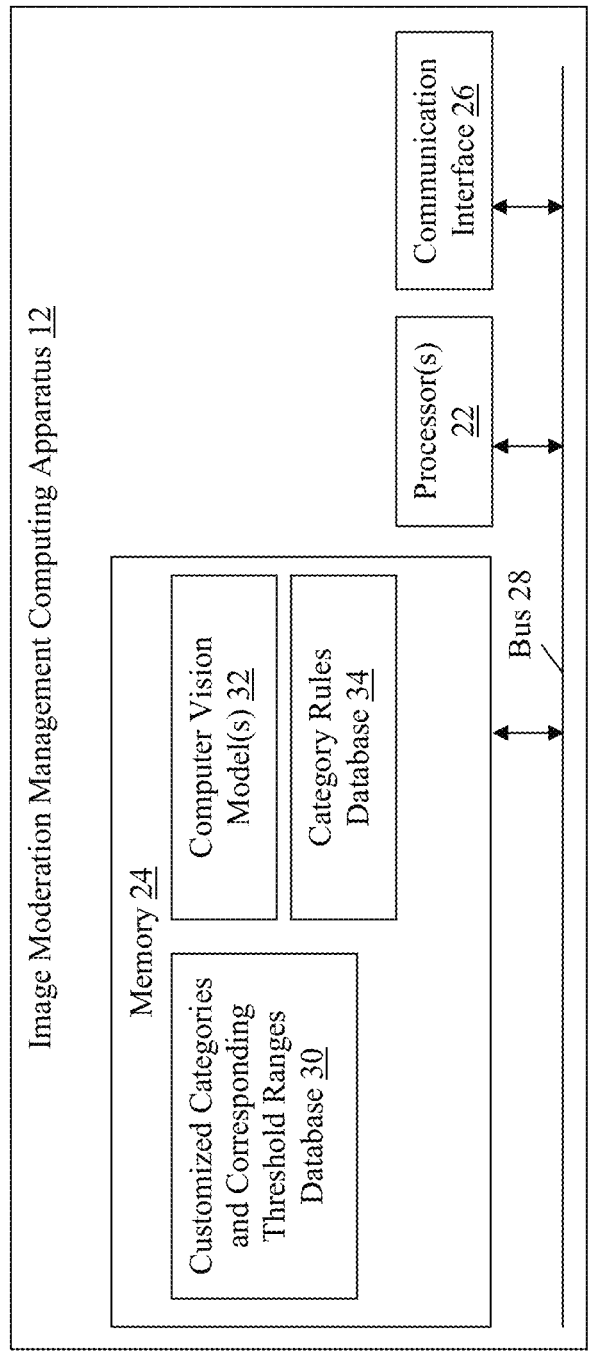
FIG. 2 is a block diagram of the example of the image moderation management computing apparatus shown in FIG. 1.

An exemplary network environment which incorporates an exemplary image moderation management system 10 is illustrated in FIGS. 1-2. In this example, the image moderation management system 10 includes an image moderation management computing apparatus 12 that is coupled to a plurality of moderator computing devices 14(1)-14(n), a plurality of client devices 16(1)-16(n), and a plurality of user devices 18(1)-18(n) via one or more communication network(s) 20, although the image moderation management computing apparatus 12, moderator computing devices 14(1)-14(n), client devices 16(1)-16(n) and/or user devices 18(1)-18(n) may be coupled together via other topologies. Additionally, the image moderation management system may include other system, devices, components, and/or elements which are well known in the art and thus will not be described herein. This technology provides a number of advantages including providing methods, non-transitory computer readable media, image moderation management systems, and image moderation management computing apparatuses that provide more effective and easily customizable image moderation.

Referring to FIGS. 1-2, the image moderation management computing apparatus 12 of the image moderation management system may perform any number of functions including moderating one or more images as illustrated and described by way of the examples herein. The image moderation management computing apparatus 12 includes one or more processors 22, a memory 24, and/or a communication interface 26, which are coupled together by a bus or other communication link 28, although the image moderation management computing apparatus 12 can include other types and/or numbers of elements in other configurations.

The processor(s) 22 of the image moderation management computing apparatus 12 may execute programmed instructions stored in the memory 24 of the image moderation management computing apparatus 12 for the any number of the functions identified herein. The processor(s) 22 of the image moderation management computing apparatus 12 may include one or more CPUs or general purpose processors with one or more processing cores, for example, although other types of processor(s) can also be used.

The memory 24 of the image moderation management computing apparatus 12 stores these programmed instructions for one or more aspects of the examples of the technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory.

Figure 3:
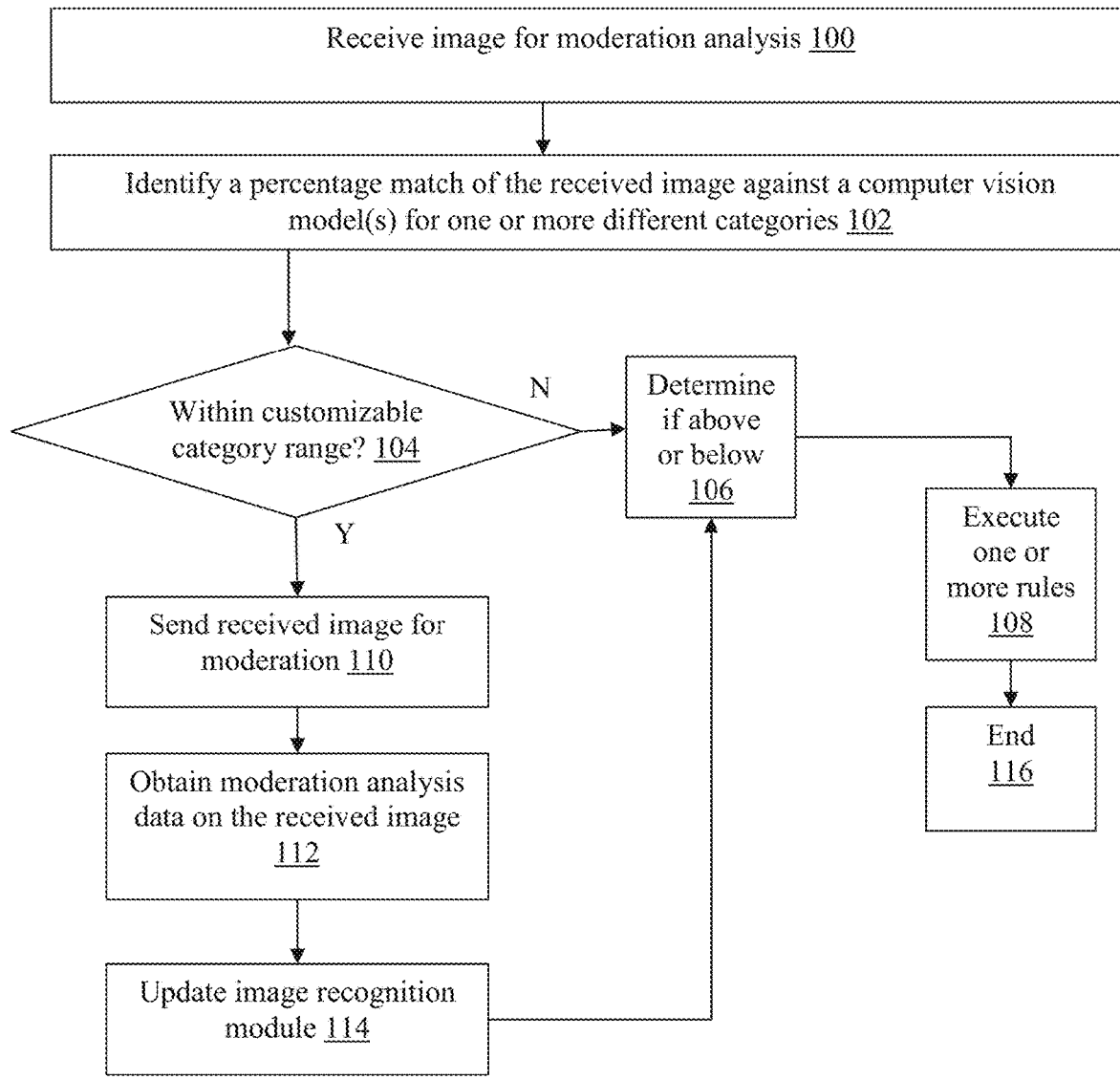
FIG. 3 is a flow chart of an example of an improved method for moderating one or more images.

Accordingly, the memory 24 of the image moderation management computing apparatus 12 can store one or more applications that can include computer executable instructions that, when executed by the image moderation management computing apparatus 12, cause the image moderation management computing apparatus 12 to perform actions, such as to moderate images, for example, and to perform other actions described and illustrated below with reference to FIGS. 1-3. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the image moderation management computing apparatus 12 itself, may be located in virtual server(s) running in a cloud-based computing environment rather than being tied to one or more specific physical network computing devices. Also, the application(s) may be running in one or more virtual machines (VMs) executing on the image moderation management computing apparatus 12. Additionally, in one or more embodiments of this technology, virtual machine(s) running on the image moderation management computing apparatus 12 may be managed or supervised by a hypervisor.

In this particular example, the memory of the image moderation management computing apparatus 12 includes one or more customized categories and corresponding threshold ranges database 30, one or more computer vision models 32, and/or a category rules database 34, although the memory can include other policies, modules, databases, and/or applications, for example. The one or more customized categories and corresponding threshold ranges 30 may include different categories of images to moderate and may include and upper and lower threshold for each to define a range of identified images which require further review and classification. The image moderation management computing apparatus 12 may use deep learning techniques to analyze and compare a requested image with a computer vision model 32 to identify one of a plurality of stored categories along with a percentage or probability of match.

By way of example, a deep learning technique or model is a stack of layers which perform certain mathematical operations on input image data, such as convolution, data augmentation, or normalization by way of example only. These layers have a set of initial parameters called weights which are tuned according to the category of data for the model to converge. Additionally, the results of this analysis as well as any feedback from one of the moderator computing devices 14(1)-14(n) may be used to update the stored database of images for the categories and also to further enhance the one or more computer vision models 32 via deep learning techniques for future analysis of requested images. One method to train each of the computer vision data model(s) 32 is through a supervised deep learning model where a category of images, such as cars by way of example only, may be fed into the image moderation management computing apparatus 12. Next, weights of the layers of supervised deep learning model may be tuned by the image moderation management computing apparatus 12 for the model to converge on a given training data, computer data vision model 32 for the category of cars in this example, although other types and/or numbers of categories for other models may be used Next, the image moderation management computing apparatus 12 may test the computer vision model 32 against validation data to see if the new model is more accurate and then process the computer vision model 32 accordingly.

In another example of a method to train each of the computer vision data model(s) 32, the image moderation management computing apparatus 12 only uses images that are inaccurately classified by the current model, such as images that are given an inaccurate or not high enough probability, to train the next iteration of the model, thus limiting the number of images used to train the model. Reducing the number of images used for training, decreases an amount of training time required while still providing an increasingly accurate model.

Further, the category rules database 34 may comprise one or more customizable rules, although the category rules database 34 may comprise other types and/or amounts of information. The one or more customizable rules can be executed on the image when a match above the upper threshold, below the lower threshold and/or within the range and is subsequently confirmed to be or not to be a match for the particular category, such as to block the requested image or to request additional verification before permitting the image to be viewed.

The communication interface 28 of the image moderation management computing apparatus 12 operatively couples and communicates between the image moderation management computing apparatus 12 and the moderator computing devices 14(1)-14(n), the client devices 16(1)-16(n), and/or the user devices 18(1)-18(n), which are all coupled together by the one or more communication network(s) 20, although other types and/or numbers of communication networks or systems with other types and/or numbers of connections and/or configurations to other devices and/or elements can also be used.

By way of example only, the one or more communication network(s) 20 may include local area network(s) (LAN(s)) or wide area network(s) (WAN(s)), and can use TCP/IP over Ethernet and industry-standard protocols, although other types and/or numbers of protocols and/or communication networks can be used. The communication network(s) 20 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s)

20 can also include direct connection(s) (e.g., for when a device illustrated in FIG. 1, such as the image moderation management computing apparatus 12, one or more of the moderator computing devices 14(1)-14(n), one or more of the client devices 16(1)-16(n), or one or more of the user devices 18(1)-18(n), operate as virtual instances on the same physical machine.

While the image moderation management computing apparatus 12 is illustrated in this example as including a single device, the image moderation management computing apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the image moderation management computing apparatus 12.

Additionally, one or more of the devices that together comprise the image moderation management computing apparatus 12 in other examples can be standalone devices or integrated with one or more other devices or apparatuses, such as one of the moderator computing devices 14(1)-14(n), for example. Moreover, one or more of the devices of the image moderation management computing apparatus 12 in these examples can be in a same or a different communication network including one or more public, private, or cloud networks, for example.

Each of the moderator computing devices 14(1)-14(n) of the image moderation management system 10 in this example includes one or more processors, a memory, and a communication interface, which are coupled together by a bus or other communication link, although other numbers and/or types of network devices could be used. The moderator computing devices 14(1)-14(n) in this example process receive and further classify sorted images falling within a dynamic range between lower and upper thresholds from the image moderation management computing apparatus 12 via the one or more communication network(s) 20. The moderator computing devices 14(1)-14(n) may be hardware or software or may represent a system with multiple servers in a pool, which may include internal or external networks.

Although the moderator computing devices 14(1)-14(n) are illustrated as single devices, one or more actions of each of the moderator computing devices 14(1)-14(n) may be distributed across one or more distinct network computing devices that together comprise one or more of the moderator computing devices 14(1)-14(n). Moreover, the moderator computing devices 14(1)-14(n) are not limited to a particular configuration. The moderator computing devices 14(1)-14(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The client devices 16(1)-16(n) of the image moderation management system 10 in this example include any type of computing device that can request image moderation services, such as mobile computing devices, desktop computing devices, laptop computing devices, tablet computing devices, virtual machines (including cloud-based computers), or the like. Each of the client devices 16(1)-16(n) in this example includes a processor, a memory, and a communication interface, which are coupled together by a bus or other communication link, although other numbers and/or types of network devices could be used.

The client devices 16(1)-16(n) may run interface applications, such as standard Web browsers or standalone client applications, which may provide an interface to make requests for image moderation services and receive response from the image moderation management computing apparatus 12 via the communication network(s) 20. The client devices 16(1)-16(n) may further include a display device, such as a display screen or touchscreen, and/or an input device, such as a keyboard for example.

The user devices 18(1)-18(n) of the image moderation management system in this example include any type of computing device that can receive, render, and facilitate user interaction which may require moderation of requested or otherwise transmitted images, such as mobile computing devices, desktop computing devices, laptop computing devices, tablet computing devices, virtual machines (including cloud-based computers), or the like. Each of the user devices 18(1)-18(n) in this example includes a processor, a memory, and a communication interface, which are coupled together by a bus or other communication link, although other numbers and/or types of network devices could be used.

The user devices 18(1)-18(n) may run interface applications, such as standard Web browsers or standalone client applications, which may provide an interface to make requests for, and receive content including images or may transmit images which may need to be moderated via the communication network(s) 20. The user devices 18(1)-18(n) may further include a display device, such as a display screen or touchscreen, and/or an input device, such as a keyboard for example.

Although the exemplary image moderation management system with the image moderation management computing apparatus 12, moderator computing devices 14(1)-14(n), client devices 16(1)-16(n), user devices 18(1)-18(n), and communication network(s) 20 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the image moderation management system 10, such as the image moderation management computing apparatus 12, moderator computing devices 14(1)-14(n), client devices 16(1)-16(n), or user devices 18(1)-18(n), for example, may be configured to operate as virtual instances on the same physical machine. In other words, one or more of the image moderation management computing apparatus 12, moderator computing devices 14(1)-14(n), client devices 16(1)-16(n), or user devices 18(1)-18(n) may operate on the same physical device rather than as separate devices communicating through communication network(s) 20. Additionally, there may be more or fewer image moderation management computing apparatus 12, client devices 16(1)-16(n), user devices 18(1)-18(n), or moderator computing devices 14(1)-14(n) than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein.

The instructions in some examples include executable code that, when executed by one or more processors, cause the processors to carry out steps necessary to implement the methods of the examples of this technology that are described and illustrated herein.

An exemplary improved method for moderating one or more images will now be described with reference to FIGS. 1-3. Referring more specifically to FIG. 3, in this example in step 100 a request that includes a Uniform Resource Locator (URL) of an image to be moderated is received by the image moderation management computing apparatus 12, although other manners for receiving or otherwise obtaining an image to be moderated could be used.

In step 102, the image moderation management computing apparatus 12 executes one of the one or more computer vision models 32, which is based on and updated by deep learning techniques as described herein, to identify a probability or percentage match of the requested image against stored images for the one or more different categories in the customized categories and corresponding threshold ranges database 30, although other types of image analysis to identify a percentage match or other correlation could be used. By way of example only, the image moderation management computing apparatus 12 may prepares each of the one or more computer vision models 30 by collecting and storing images for the one or more different categories selected by the subscribing one of the client devices 16(1)-16(n) for image moderation services. Next, the image moderation management computing apparatus 12 may feed the collected images for one of the categories into one of the one or more computer vision models 30 which uses deep learning techniques to classify or recognize the category or categories an image might fit in. Next, the one of the one or more computer vision models 30 in the image moderation management computing apparatus 12 may be used to determine and output the probability or percentage match that the received image is in one of the one or more stored categories, although other manners for developing an computer vision model and/or other image analysis techniques may be used.

In step 104, the image moderation management computing apparatus 12 determines when a determined probability or percentage match for the received image falls within a customizable range between upper and lower thresholds for any of the one or more stored categories. In this example, for ease of illustration and description, falling within only one range for one category is generally described, although a received image could fall within a customizable range of multiple categories. Since the approach used for managing each category which may be a match is the same, the approach for managing multiple matches is not described in detail in this example.

By way of example only, the subscribing one of the client devices 16(1)-16(n) may have set for a particular image category a customizable lower threshold percentage match of 20% and above a customizable upper threshold of 80%, i.e. a 60% range in this example of the received image possibly being in the category. If in this example, if the probability or percentage match for the image is within the range between the lower threshold percentage match of 20% and the upper threshold of 80% then the image moderation management computing apparatus 12 may send the image to one of the moderator computing devices 14(1)-14(n) for further analysis and classification. Additionally, in this example if the probability or percentage match for the image is below the customizable lower threshold percentage match of 20% then the image moderation management computing apparatus 12 may execute one or more of a plurality of stored rules, set in this example by the subscribing one of the client devices 16(1)-16(n), on the requested image, such as a rule to allow viewing of the requested image. Further, in this example if the probability or percentage match is above the customizable upper threshold percentage match of 80% then the image moderation management computing apparatus 12 may execute one or more of the plurality of stored rules, again set in this example by the subscribing one of the client devices 16(1)-16(n), on the requested image, such as a rule to block the requested image and/or to send a notice requesting further verification or approval to see the requested image.

The image moderation management computing apparatus 12 may already have stored in the customized categories and corresponding threshold ranges database 30 one or more categories of images to moderate, such as categories for nudity and violence by way of example only, and upper and lower thresholds for each of the categories. Again these may be set by the subscribing one of the client devices 16(1)-16(n), although other manners for setting these can be used. Accordingly, with this technology the moderation of images can easily be customized based on not only a particular setting or environment, such as at home or in an office, but also based on one or more characteristics, such as age and/or culture, which could vary the ranges even in the same setting. By way of example, in a home setting the ranges could be set differently for a household with young children as opposed to adult children or could be adjusted based differently in a home setting based on the particular cultural background.

If in step 104, the image moderation management computing apparatus 12 determines that the probability or percentage falls outside of the customizable range, i.e. above the upper threshold or below the lower threshold, then the No branch is taken to step 106. In step 106, the image moderation management computing apparatus 12 determines if the probability or percentage match is above the upper threshold or below the lower threshold.

In step 108, the image moderation management computing apparatus 12 determines which of one or more stored rules from the category rules database 34 to execute based on the determination of whether the probability or percentage match is above the upper threshold or below the lower threshold. For example, if the probability or percentage is above the upper threshold, then the image moderation management computing apparatus 12 may execute one of the stored rules from the category rules database 34 to block the image or request additional verification to grant access to the image, although other types and/or numbers of rules may be executed. In another example, if the probability or percentage is below the lower threshold, then the image moderation management computing apparatus 12 may execute other of the stored rules from the category rules database 34 to allow the requested image. Once completed, then this example of the method with respect to the received image may end.

If back in step 104, the image moderation management computing apparatus 12 determines that the probability or percentage falls within the customizable range, i.e. between the upper threshold and the lower threshold, then the Yes branch is taken to step 110. In step 110, the image moderation management computing apparatus 12 sends the received image or for example the URL for the image to one of the moderator computing devices 14(1)-14(n). The one of the moderator computing devices 14(1)-14(n) may then review the received image and the identified one or more categories and then for each of the identified categories generate and provide moderation analysis data regarding the probability or percentage match as being either be above the upper threshold or below the lower threshold for the one or more identified categories. Additionally, the one of the moderator computing devices 14(1)-14(n) may provide in the moderation analysis data additional information which can be used to further refine the computer vision model 32.

In step 112, the image moderation management computing apparatus 12 may obtain the moderation analysis data regarding the probability or percentage match as being confirmed to either be above the upper threshold or below the lower threshold for the one or more categories along with information to be used to further refine the computer vision model 32. The image moderation management computing apparatus 12 also may forward the moderation analysis data to the subscribing one of the client devices 16(1)-16(n).

In step 114, the image moderation management computing apparatus 12 may store the received image and the moderation analysis data may be run through a training module in memory 24 using deep learning techniques to create an updated and more accurate computer vision model 32. By way of example, the training module executed by the image moderation management computing apparatus 12 also can create live models in real-time so the computer vision model 32 is updated immediately or in real time. With live training, as soon as the image gets moderated and when the image is either a false positive or a negative, the computer vision model 32 in the image moderation management computing apparatus 12 is trained to rectify for such mistakes and keep learning on the go. By way of example, the training module executed by the image moderation management computing apparatus 12 also can create batches where the computer vision model 32 is periodically updated. With batch training, when a significant number of misrecognized images have accumulated, then the computer vision model 32 in the image moderation management computing apparatus 12 is trained to rectify for such mistakes.

Following step 114, the image moderation management computing apparatus 12 can proceed to steps 106 and 108 as described earlier based on the moderation analysis data for the received image which now would indicate either a match, i.e. above the upper threshold, or no match, i.e. below the lower threshold.

Accordingly, as illustrated and described by way of the examples herein, the claimed technology provides more effective moderation of images, such as avatars, profile pictures, contest entries, and photo album pictures by way of example. Additionally, with this technology customizable feedback from a moderator can be quickly and easily incorporated in. Further with this technology, moderation of images can easily be customized based not only on the particular setting or environment, but also based on one or more characteristics, such as age and/or culture, by way of example.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A non-transitory computer readable medium having stored thereon instructions for moderating one or more images comprising executable code which when executed by one or more processors, causes the one or more processors to:
   identify based on an automated image analysis a percentage match of an image against one or more computer vision models for one or more categories to moderate with respect to accessibility to view the image and which is based on a deep learning technique;
   determine when the identified percentage match is within a range between customizable lower and upper thresholds for the one or more of the categories to moderate with respect to accessibility to view the image;
   obtain image moderation analysis data on adjusting the identified percentage match of the image in at least one of the categories to moderate with respect to accessibility to view the image from one of one or more moderator computing devices when the identified percentage match is determined to be within the range;
   adjust the identified percentage match to an adjusted percentage match above the upper threshold or below the lower threshold based on the image moderation analysis data; and
   execute one of one or more stored rules from a database on the image based on whether the identified percentage match or the adjusted percentage match for the corresponding one of the one or more categories to moderate with respect to accessibility to view the image is above the upper threshold or below the lower threshold.

2. The non-transitory computer readable medium of claim 1, wherein the executable code when executed by the one or more processors further causes the one or more processors to update the one or more computer vision models based on the obtained image moderation analysis data.

3. The non-transitory computer readable medium of claim 2, wherein the update is executed in a real time mode.

4. The non-transitory computer readable medium of claim 2, wherein the update is executed in a batch mode.

5. The non-transitory computer readable medium of claim 1, wherein the executable code when executed by the one or more processors further causes the one or more processors to execute a different one of one or more stored rules on the image when the percentage match is above the upper threshold.

6. The non-transitory computer readable medium of claim 1, wherein the executable code when executed by the one or more processors further causes the one or more processors to executing the stored programmed instructions to execute another different one of one or more stored rules on the image when the percentage match is below the lower threshold.

\* \* \* \* \*